United States Patent
Zhao

(10) Patent No.: US 7,359,706 B2
(45) Date of Patent: Apr. 15, 2008

(54) DATA TRANSMISSION FOR MOBILE WIRELESS COMMUNICATION DEVICES

(75) Inventor: Yilin Zhao, Northbrook, IL (US)

(73) Assignee: Motorola Inc., Schaumburg, IL (US)

( * ) Notice: Subject to any disclaimer, the term of this patent is extended or adjusted under 35 U.S.C. 154(b) by 1156 days.

(21) Appl. No.: 09/934,196

(22) Filed: Aug. 21, 2001

(65) Prior Publication Data

US 2003/0040331 A1 Feb. 27, 2003

(51) Int. Cl.
*H04Q 7/20* (2006.01)

(52) U.S. Cl. .................... 455/436; 370/331; 455/456.1
(58) Field of Classification Search ............... 455/450, 455/451, 452.2, 436, 437, 438, 439, 440, 455/441, 442, 443, 444, 445, 456.1; 370/331
See application file for complete search history.

(56) References Cited

U.S. PATENT DOCUMENTS

| | | | |
|---|---|---|---|
| 6,215,811 B1 * | 4/2001 | Yuen | 375/143 |
| 6,222,483 B1 * | 4/2001 | Twitchell et al. | 342/357.09 |
| 6,327,471 B1 * | 12/2001 | Song | 455/440 |
| 6,456,858 B1 * | 9/2002 | Streter | 455/552.1 |
| 6,704,571 B1 * | 3/2004 | Moon | 455/436 |
| 7,149,534 B2 * | 12/2006 | Bloebaum et al. | 455/456.6 |
| 2001/0014604 A1 * | 8/2001 | Kingdon et al. | 455/427 |
| 2006/0013165 A1 * | 1/2006 | Choi et al. | 370/331 |

* cited by examiner

*Primary Examiner*—Olisa Anwah
(74) *Attorney, Agent, or Firm*—Joseph T. Cygan

(57) ABSTRACT

A method and apparatus to transmit data between a communication network and a mobile station just before prior to the mobile station switching from a fast data rate mode, such as digital mode, to a slow data rate mode, such as analog mode. The mobile station requests or the communication network transmits data prior to the mobile station entering the slow data rate mode, therefore eliminating the need to transmit data over a slow data rate mode, such as analog mode.

2 Claims, 6 Drawing Sheets

US 7,359,706 B2

DATA TRANSMISSION FOR MOBILE WIRELESS COMMUNICATION DEVICES

FIELD OF THE INVENTION

The present invention relates generally to the transmission of data between a communication network and a mobile wireless communication station, and in particular, the present invention relates to locating mobile stations in cellular communication networks.

BACKGROUND OF THE INVENTION

The U.S. Federal Communications Commission (FCC) has recently made E911 a mandatory requirement for wireless communications services such as cellular telephone, wideband (broadband) personal communications services (PCS), and geographic area specialized mobile radio (SMR). This ruling and upcoming service is called wireless E911. The FCC requires that by Oct. 1, 2001, public safety answering point (PSAP) attendants of wireless communications networks must be able to know a 911 caller's phone number for return calls and the location of the caller, so that the calls can be routed to an appropriate PSAP and related emergency assistance attendants.

The Global Positioning System (GPS) includes a network of satellites orbiting the earth and transmitting signals that can be detected by GPS receivers located on the ground. The GPS receivers, which decode and process the detected GPS satellite signals to determine precise location information of a user regardless of weather conditions, can be portable or mounted in ships, planes, cars, or in mobile wireless communication stations or mobile stations, such as radiotelephones, pagers, personal digital assistants (PDA), two-way radios, or similar wireless devices. In this way, GPS provides positioning and timing data that is used for a variety of applications, including determining the position of the mobile station to enable network operators to provide value-added services.

In assisted GPS mobile station positioning schemes, one or more ground based reference station or location server nodes, coupled to a cellular communications network, receive GPS satellite data and re-transmit the data in the form of assistance messages over the cellular air interface to mobile stations for use in position determination.

FIG. 1 is a schematic diagram of a typical cellular communication system. As illustrated in FIG. 1, a cellular communication system 100 includes a number of cells 102-114, each defining a radio coverage area established by a fixed site base station located within each cell. As illustrated in FIG. 1, cell 102 defines the radio coverage area established by a base station 116 coupled to an antenna 118 located in cell 102. Similarly, each of the remaining cells 104-114 define an associated coverage area established by corresponding base stations 120-130 coupled to corresponding antennas 132-142 located within each of cells 104-114.

A cellular communications network 144 coupled to a GPS reference receiver 146 receives data from a GPS network of satellites 148 through GPS reference receiver 146 and re-transmits the data in the form of assistance messages over an interface or fixed link 150 via other nodes to base stations 116 and 120-130. The assistance data is then transmitted over the air via antennas 118 and 132-142 in a point-to-point mode to a single wireless mobile station, or in a point-to-multipoint mode or broadcast mode to multiple wireless mobile stations along a cellular carrier signal 152. It is understood that while a single GPS reference receiver is shown in FIG. 1 for brevity, network 144 receives data from GPS network of satellites 148 through multiple GPS reference receivers or a wide area differential GPS reference receiver network.

As a wireless mobile station 154 travels with a user from position x to position y in cellular communication system 100, mobile station 154 continuously monitors the signal characteristics from base stations 116, 120-130 of cells 102-114 and, based on certain selection criteria, selects or is directed to a cell from which to receive and transmit signals, including the assistance data, with network 144. For example, while mobile station 154 is positioned in cell 112, if the signal characteristics from cell 112 are such that, based on the selection criteria, cell 112 is selected as the "best" coverage area, cell 112 is considered to be the "serving cell", or cell from which mobile station 154 transmits and receives signals. Mobile station 154 continues to monitor the signal characteristics from cells 102-114, and, as illustrated in FIG. 1, as mobile station 154 subsequently moves along the marked path from position x to position y, mobile station 154 moves from the coverage area associated with cell 112 into the coverage area associated with other cells, such as cells 114 and 106 for example. Once the signal characteristics from another cell, cell 114 for example, are such that that cell is considered the best cell, mobile station 154 or network 144 reselects or determines that cell as the serving cell, until the signal characteristics from another cell, cell 106 for example, are such that that cell is considered the best cell, and mobile station 154 or network 144 reselects or determines that cell as the serving cell, and so on.

It is possible for each of base stations 116, 120-130 in cellular communication system 100 to operate in one of various differing modes, such as an analog mode, a time division multiple access (TDMA) mode, a code division multiple access (CDMA) mode, a general packet radio service (GPRS) mode, wideband CDMA (W-CDMA) mode, or universal mobile telecommunications service (UMTS) mode, for example. It is also possible that each cell contains more than one base station or contains co-located base stations in which each one operates in its own mode. As a result, in order to operate in each of cells 102-114, mobile station 154 is typically a multi-mode device able to operate in multiple modes, including CDMA/Analog, TDMA/Analog, GPRS/GSM, UMTS/GSM, W-CDMA/GSM, W-CDMA/GPRS/GSM, and cdma2000/cdmaOne.

Since cells 102-114 operate in various different modes, mobile station 154 must also switch between modes as required during the cell reselection and "handover". For example, if cell 112 operates in the CDMA mode, cell 114 operates in the analog mode, and cell 106 operates in the CDMA mode, mobile station 154 must switch from the CDMA mode to the analog mode when reselecting or transitioning from cell 112 to cell 114, and from the analog mode to the CDMA mode when reselecting or transitioning from cell 114 to cell 106, and so forth.

However, since the rate at which data can be transmitted when in an analog mode is much less than the rate at which data can be transmitted when in a CDMA mode or a TDMA mode, for example, transmission of the location assistance data becomes problematic when mobile station 154 selects or transits to an analog cell as a serving cell. Accordingly, a method and apparatus is needed for improving transmission, by avoiding transmission of assistance data or any type of data when a multi-mode device is in a slow data rate mode, for example analog mode.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

Figure 1:
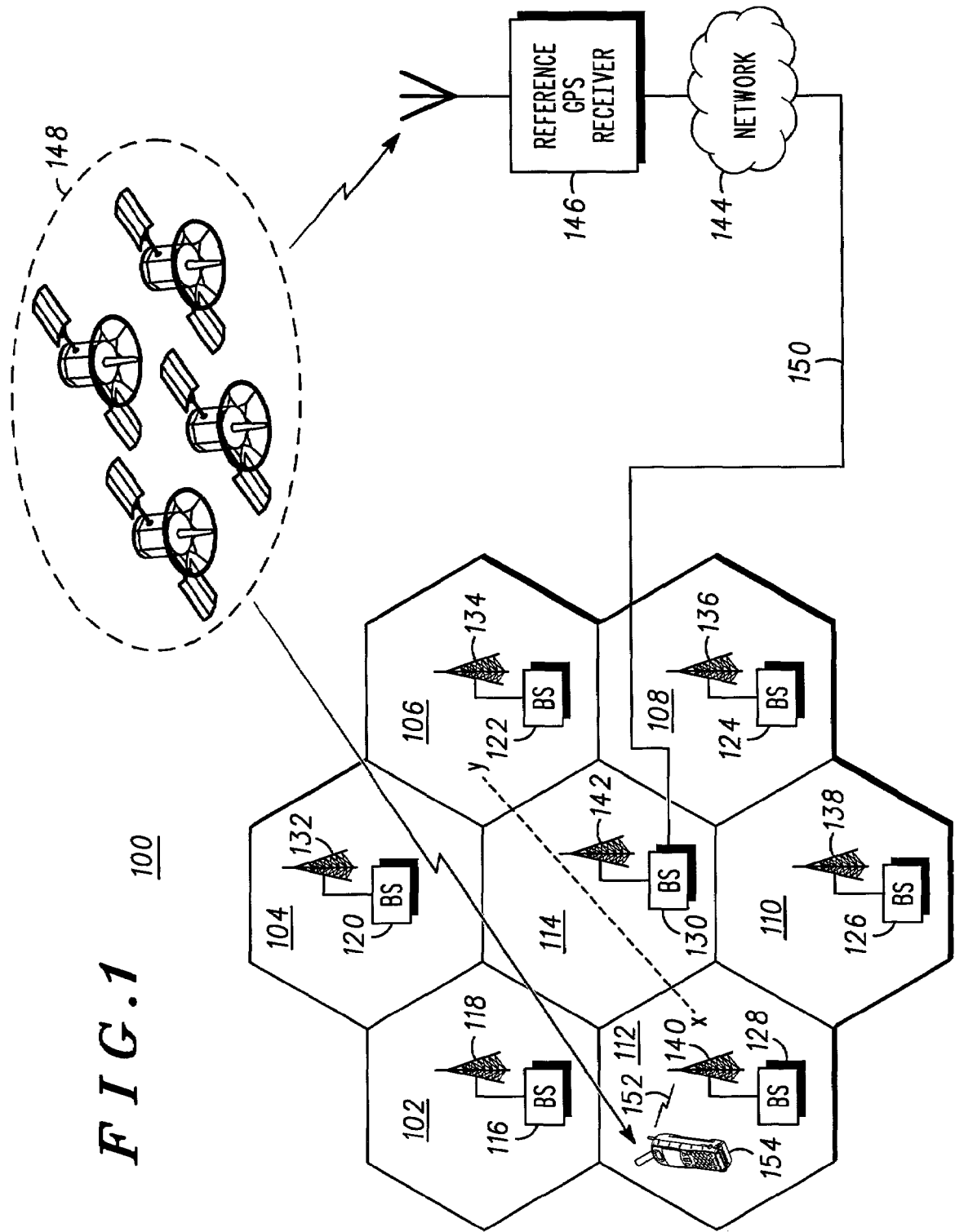
FIG. 1 is a cellular communications network supporting assisted GPS location of a satellite positioning system enabled mobile receiver.

Although the present invention is illustrated in these figures, the drawings and following description are not be interpreted as limiting the innovation. They are used to describe this invention for the purpose of fully understanding. In certain cases, well-known or conventional details are not included.

DETAILED DESCRIPTION OF THE INVENTION

In one embodiment of the invention, data is transmitted from a communication network to a mobile wireless communication station before the mobile wireless communication station switches from a fast data rate mode, such as digital mode, to a slow data rate mode, such as analog mode. The mobile wireless communication station is monitored to determine when the mobile wireless communication station will enter a slow data rate mode. In another embodiment of the invention, the mobile wireless communication station requests data from the communication network prior to the mobile wireless communication station entering the slow data rate mode. Both embodiments eliminate the need to transmit data over a slow data rate mode. Data received by the mobile wireless communication station is stored within the mobile wireless communication station while in the slow data rate mode until the data is requested by an application.

Location assistance data for assisted GPS technology is transmitted from the communication network to the mobile station. Location assistance data may include GPS ephemeris and clock corrections (ephemeris), almanac, ionospheric delay elements, Universal Time Coordinate (UTC) offsets, DGPS corrections, Doppler and its search window, code phase and its search window, reference time, reference location, base station almanac, and other items. The mobile station then transmits position measurements or position estimate data back to the communication network. Location assistance, position measurement, and position estimate data are stipulated in protocols that are specified in various standard documents, for example IS-801 and IS-817 for CDMA systems, TIA/EIA-136-C and pending IS-869 for TDMA systems, TrS03.71 and TS04.31 and TS04.35 for GSM systems, and TS25.305 and TS25.331 for W-CDMA/UMTS systems.

For assisted GPS technology, two methods exist: MS-assisted GPS and MS-based GPS. The MS-assisted GPS shifts the majority of the traditional GPS receiver functions to the network processor. This method requires an antenna, RF section, and digital processor in the mobile station for making measurements by generating replica codes and correlating them with the received GPS signals. The communication network transmits an assistance message to the mobile station, consisting of time, visible satellite list, satellite signal Doppler, code phase and their search windows. In MS-assisted GPS, the mobile station such as a multi-mode device, reports position measurements to the communication network and the communication network calculates the position of the mobile station. Transmitted assistance data is typically valid for a few minutes.

The MS-based GPS maintains a fully functional GPS receiver in the mobile station, which includes means for computing the positions of the satellites and mobile station. A stand-alone GPS receiver can be classified as one type of MS-based GPS. This mobile station function adds to the total memory (RAM/ROM) requirements of the mobile station in addition to the extra computing capability such as extra Million Instructions Per Second (MIPS). In MS-based GPS, data in the form of the precise satellite orbital elements, or ephemeris, as well as reference time and location must be provided to the mobile station. The mobile station, such as a multi-mode device, calculates position of the mobile station and reports the position estimate to the communication network. Transmitted ephemeris data to a mobile station along with other assistance data is utilized by the mobile station to calculate position and is typically valid for up to 4 hours. The assisted data transmitted to the mobile station in MS-based GPS uses more bandwidth than MS-assisted GPS and is valid longer in the mobile station. The report back to the communication network from the mobile station in MS-based GPS uses less bandwidth than MS-assisted GPS.

Essential location assistance data required for both MS-assisted and MS-based GPS solutions include: reference location, reference time, and ephemeris and clock correction data. Ephemeris and reference time can be used for example, to provide code phase along with search window widths and ephemeris and reference location, for example, can be used to provide Doppler information along with search window widths to produce pseudo range measurements in MS-assisted GPS to determine position of the mobile station. Ephemeris data can be used directly in the mobile stations along with reference time and location to generate the position of the mobile station in MS-based GPS. Ephemeris data transmitted to the mobile station is valid for up to 4 hours and can cover a large geographical area. Therefore, the mobile station can keep a current set of ephemeris data in order for the mobile station to provide instant location service. The current set of ephemeris can be transmitted to the mobile station once the mobile station powers up. After receiving the current ephemeris data, based on the ephemeris age limit ($t-t_{oe}$), the mobile station decides when to request an update or direct the communication network to send ephemeris for all visible satellites for which the ephemeris of the mobile station is older than the ephemeris age limit specified. The ephemeris age limit is used with satellite ID's and the corresponding Issue of Data Ephemeris (IODE), where t is the current time and $t_{oe}$ is the time of applicability of ephemeris. Together, t and $t_{oe}$ determine whether the ephemeris associated with a particular satellite should be updated or whether the ephemeris associated with a rising satellite should be transmitted to the mobile station. Since up to 12 satellites can be visible to a ground based GPS receiver at any particular moment, the communication network does not need to constantly transmit all visible satellite ephemeris to the mobile station, thus decreasing utilized bandwidth.

Since a full set of ephemeris data is relatively long in message length, it will severely affect the normal mobiles station services if transmitted in a slow data rate mode. For instance, during a voice call in an analog cell, the voice conversation must be paused for a long period of time in order to use the same channel to transmit assistance data for a location service request. The present invention is not limited to ephemeris data or location assistance data transmission. The present invention can also be used in many other data-oriented services and applications. Short data messages can still be transmitted on demand if necessary or if the service quality is not compromised.

Mobile wireless communication stations, or mobile stations, including multi-mode devices can operate in one of various differing modes, such as an analog mode, a time division multiple access (TDMA) mode, a code division multiple access (CDMA) mode, a general packet radio service (GPRS) mode, a wideband CDMA (W-CDMA) mode, or a universal mobile telecommunications service (UMTS) mode, for example. As a result, a mobile station such as a multi-mode device operates in more than one mode including CDMA/Analog, TDMA/Analog, GPRS/GSM, UMTS/GSM, W-CDMA/GSM, W-CDMA/GPRS/GSM and cdma2000/cdmaOne. Each mode operates at a different data rate. Data rate is the rate that data is transmitted, for example 100 bps, 9.6 kbps, and 2 Mbps, over a channel. According to the present invention, the data that the mobile station requests will be transmitted from the communication network to the mobile station just before the mobile station switches from a fast data rate mode, such as digital mode, to a slow data rate mode, such as analog mode. Data that is transmitted to the mobile station prior to the mobile station entering a slow data rate mode, such analog mode, includes data transmission for any application and service, for example location assistance data, as well as images, videos, teleconferences and multimedia.

Although the present invention is described with respect to location assistance data in a CDMA/Analog system, it is understood that various data, for example images, videos, teleconferences, and multimedia are applicable. It is also understood that various systems, for example: CDMA/Analog, TDMA/Analog, GPRS/GSM, UMTS/GSM, W-CDMA/GSM, W-CDMA/GPRS/GSM and cdma2000/cdmaOne are applicable to the present invention. Currently, the standards specify that location assistance data is transmitted on demand. For example, a mobile station transmits location assistance data over the CDMA mode when the mobile station is in digital mode and over the analog mode when in the analog mode. The mobile station and communication network know in advance or can predict when the mode may switch from CDMA to analog mode. According to the present invention, the mobile station can pre-request or the communication network pre-transmit location assistance data before the mobile station enters the analog mode.

Location assistance data is sent from the communication network to the mobile station in the form of messages as defined in IS-801 for digital mode and IS-817 for analog mode in CDMA systems. To avoid sending location assistance data over a slow mode such as analog, the location assistance data can be transmitted to the mobile station prior to entering the analog mode. The location assistance data is then stored in the memory of the phone (RAM/ROM) and accessed when a location service application is requested. "Base station" or "communication network" refers to the functions performed on the cellular communication network side, which are typically distributed among a Base Station Transceiver (BTS), and Base Station Controller (BSC), a Mobile Switching Center (MSC), Mobile Positioning Center (MPC), Position Determination Entity (PDE) or Location Server coupled with a reference GPS receiver, and any Inter-Working Function (IWF) required for communication network connection. "Satellite communication network" refers to the functions performed on the satellite network side.

In CDMA (cdmaOne/cdma2000) systems, system selection/reselection happens typically during the system determination sub-state of the mobile station, while idle handoff happens typically during the idle state, and soft and hard handoffs happen typically during the access and traffic channel states. In contrast, for GSM, TDMA, UMTS, and W-CDMA systems, cell reselection happens typically during the idle state of the mobile station while handover happens during the connected or dedicated state. In this invention, "cell reselection" represents idle handoff used in CDMA specifications or cell reselection used in other system specifications. "Handover" represents handoff used in CDMA specifications or handover used in other system specifications.

Based on standard TIA/EIA/IS-95-B, during the mobile station idle state, a cell reselection or idle handoff occurs when a mobile station has moved from the coverage area of one base station into the coverage area of another base station. If the mobile station determines that one of the Neighbor Set or Remaining Set pilot channel signals is sufficiently stronger than the pilot channel of the Active Set, the mobile station should perform the cell reselection. In certain systems, a pilot beacon is detected if the cell that will be reselected is an analog cell. In other systems, no cell is selected if there is no CDMA coverage.

Figure 2:
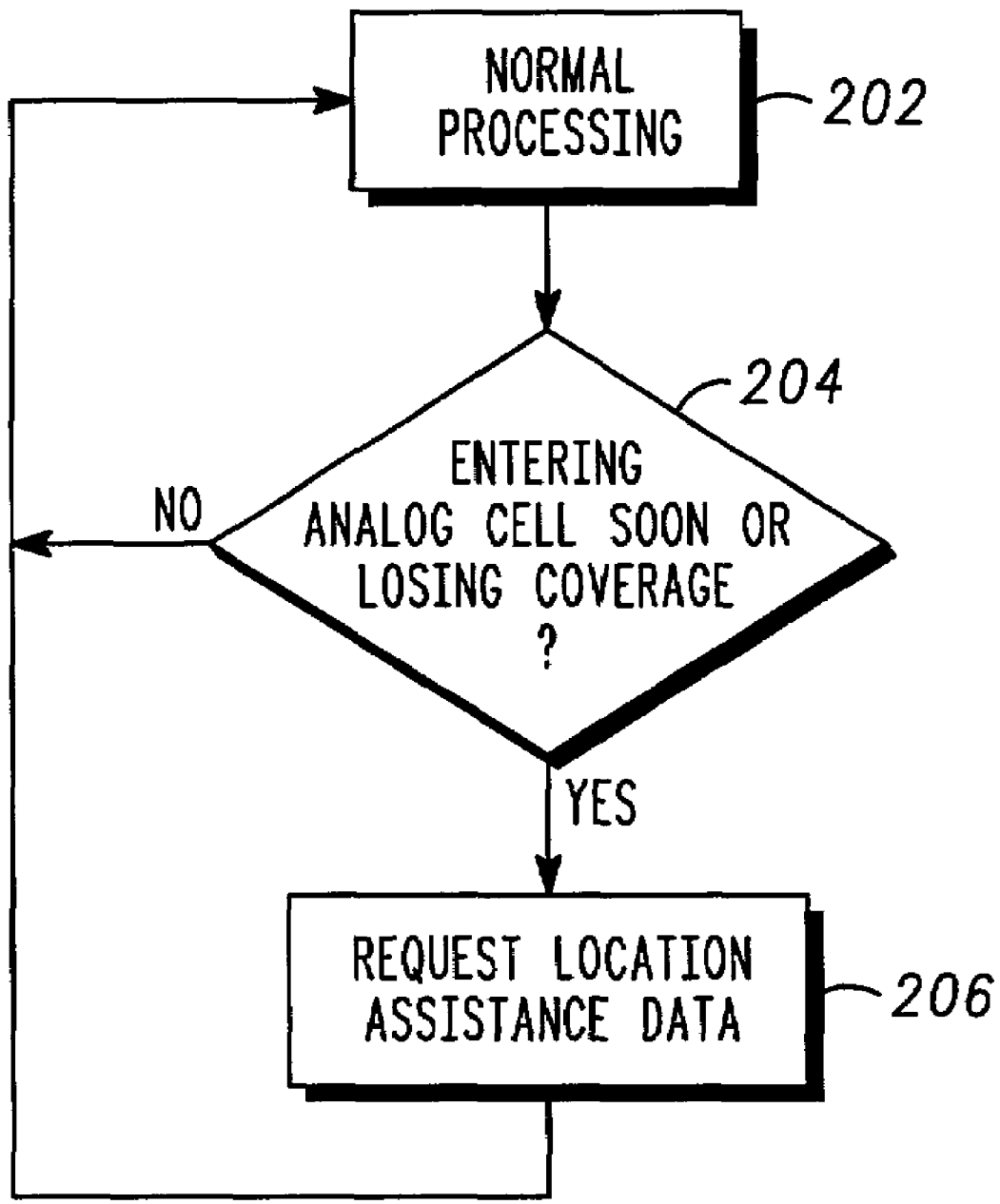
FIG. 2 is a data flow diagram illustrating a mobile station requesting location assistance data from the base station before entering into an analog cell, according to the present invention.

FIG. 2 is a data flow diagram illustrating a mobile station requesting location assistance data from the base station before entering into an analog cell, according to the present invention. The mobile station knows when it will reselect a new cell. In cell reselection, according to FIG. 2, if the mobile station will not enter an analog cell soon or is not losing coverage 204, the mobile station remains in normal processing 202. If the mobile station will select an analog cell soon or is losing coverage 204, the mobile station can request location assistance data 206 before it enters the analog cell. Once location assistance data is received from the base station, the data is stored in the phone. The mobile station then enters the analog cell or loses its coverage. The location assistance data may not be delivered, such as in the case of ephemeris. The mobile station may already have valid ephemeris, which is received right after the mobile station is powered up or from a previous data communication session with the base station. How to verify ephemeris freshness are discussed in FIG. 3 below. The location assistance data is accessed when a location service application is requested.

According to standard TIA/EIA/IS-95-B, the mobile station uses pilot detection thresholds, for example T_ADD, T_DROP, T_COMP, and T_TDROP, along with measured signal strengths sent to the node, or serving base station, to permit the system to complete the analog handover decision.

Figure 3:
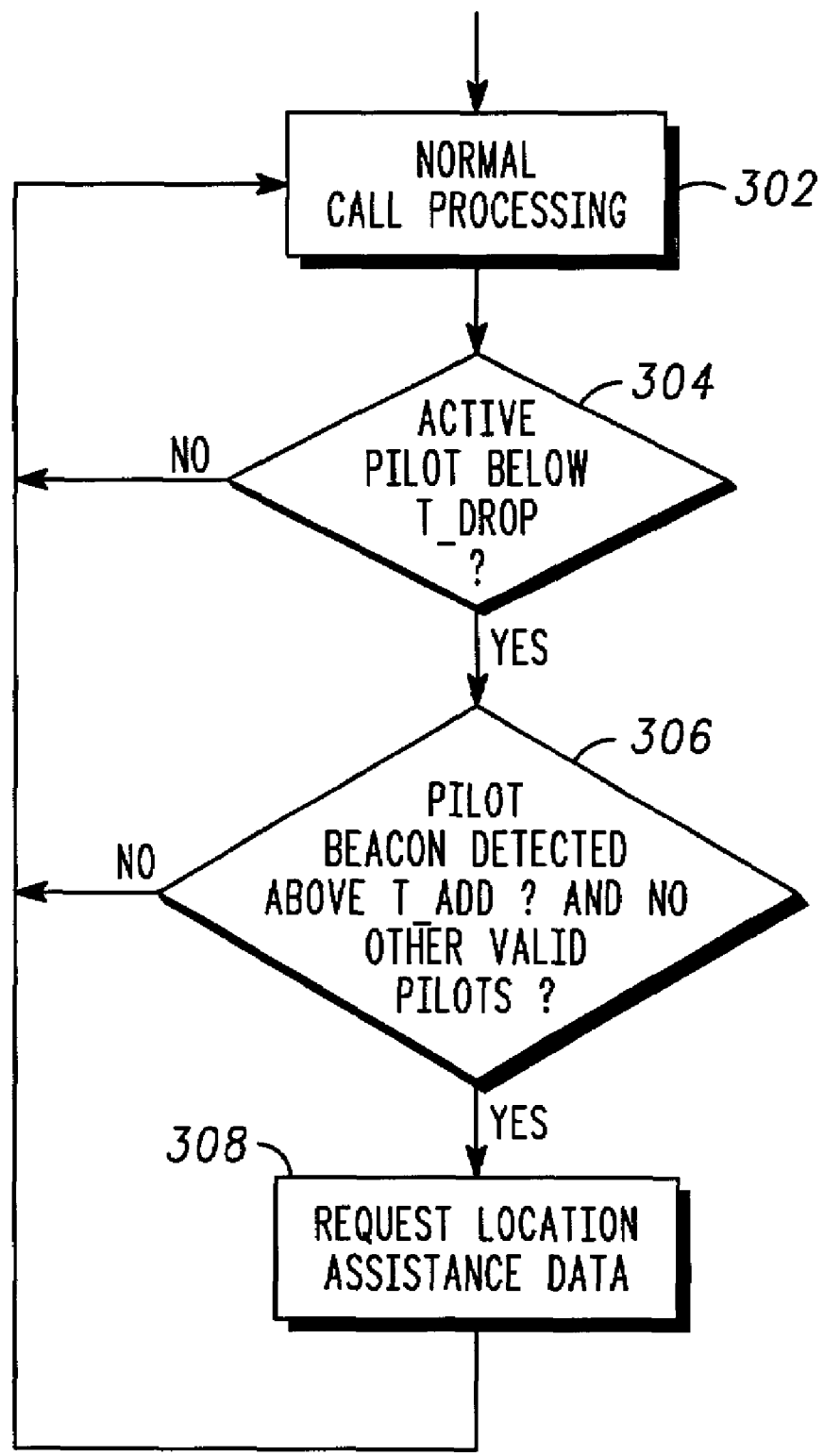
FIG. 3 is a data flow diagram illustrating an alternative method of a mobile station requesting location assistance data from the base station before entering into the analog mode, according to the present invention.

Different methods are used to direct a mobile station to perform a CDMA to analog handover: pilot beacons, database assisted, and mobile-assisted. As a result, there are different methods by which a mobile station can request location assistance data before switching to the analog mode. FIG. 3 is a data flow diagram illustrating an alternative method of a mobile station requesting location assistance data from the base station before entering into the analog mode, according to the present invention. For pilot beacon based handover, when the signal strength of the pilot in the Active Set is above T_DROP 304, the mobile station remains in normal call processing 302. When the signal strength of the pilot in the Active Set is below T_DROP 304, the pilot beacon on the boundary of CDMA and analog cells is detected above T_ADD 306, and there are no other pilot signal strengths 306, for example, above T_DROP, the mobile station is triggered to request location assistance data 308 from the base station. The mobile station requests location assistance data 308 from the base station before it transits to an analog cell or loses the coverage of the CDMA cell. Location assistance data may not be delivered, such as in the case of ephermeris. Since ephemeris data may contain up to 12 satellites, the mobile station and communication network can use the ephemeris age limit to decide whether transmitting the entire set of ephemeris is necessary. Although there is a request for data, the data transmission may not be needed if the ephemeris set at the mobile station is still valid. The mobile station or base station could determine, based on the ephemeris age limit, satellite IDs and associated IODE, that requesting or transmitting this data is unnecessary if the data at the mobile station is still valid. The mobile station or base station may determine that only a partial set of ephemeris data is necessary. If location assistance data is sent from the base station to the mobile station, the data is stored in the phone. The mobile station then enters the analog mode. The location assistance data is accessed when a location service application is requested. In database assisted handover, the condition of the pilot beacon detected above T_ADD 306 can be ignored. When the signal strength of the pilot in the Active Set is below T_DROP 304, and there are no other pilot signal strengths 306, for example, above T_DROP, the mobile station is triggered to request location assistance data 308 from the base station. When the signal strength of the pilot in the Active Set is above T_DROP 304, the mobile station remains in normal call processing 302. The mobile station requests location assistance data 308 from the base station before it transits to an analog cell or loses the coverage of the CDMA cell, but location assistance data may not be delivered, such as in the case of ephemeris. The mobile station or base station could determine, based on the ephemeris age limit, satellite IDs and associated IODE, that requesting or transmitting the data is unnecessary if the data at the mobile station is still valid. The mobile station or base station may determine that only a partial set of ephemeris data is necessary. If location assistance data is sent from the base station to the mobile station, the data is stored in the phone. The mobile station then enters the analog mode. The location assistance data is accessed when a location service application is requested.

Figure 4:
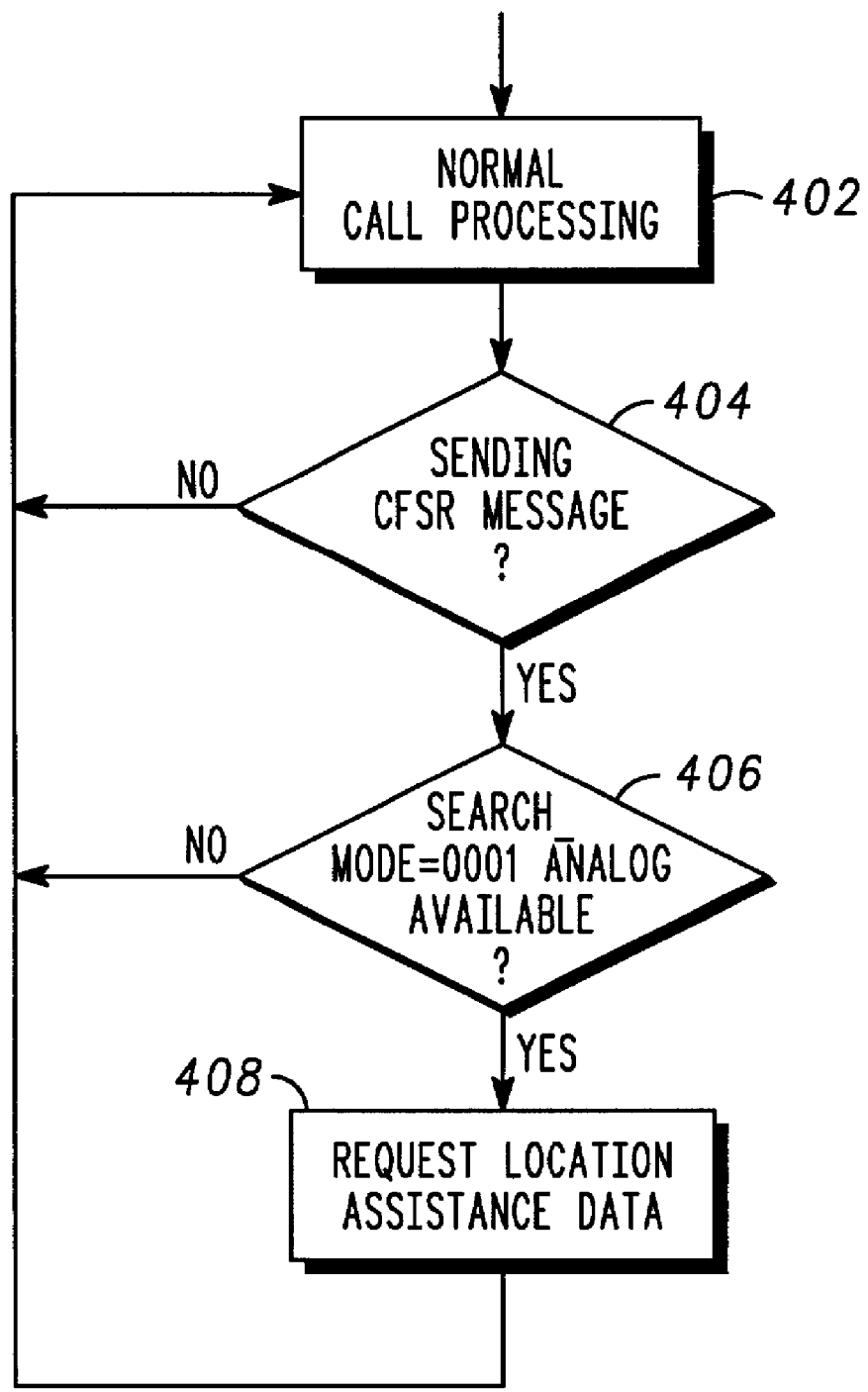
FIG. 4 is a data flow diagram illustrating an alternative method of a mobile station requesting location assistance data from the base station before entering into the analog mode, according to the present invention.

FIG. 4 is a data flow diagram illustrating an alternative method of a mobile station requesting location assistance data from the base station before entering into the analog mode, according to the present invention. In mobile assisted handover, according to FIG. 4, the mobile station monitors when a Candidate Frequency Search Response Message (CFSR) will be sent 404 to the serving base station. If a Candidate Frequency Search Response Message is not sent 404 to the serving base station, the mobile station remains in normal call processing 402. If a Candidate Frequency Search Response Message is sent 404 to the serving base station, the command code SEARCH_MODE field 406 within a requesting Candidate Frequency Search Request Message is reviewed. If the command code SEARCH_MODE field 406 is not equal to '0001', analog mode is not available, the mobile station remains in normal call processing 402. If the command code SEARCH_MODE field 406 is equal to '0001', analog mode is available; the mobile station is triggered to request location assistance data 408 from the base station before the handover from digital mode to analog mode is initiated. Alternatively, the mobile station can be triggered slightly early to request location assistance data 408 immediately after receiving the Candidate Frequency Search Request Message from the base station. The mobile station requests location assistance data 408 from the base station, but location assistance data delivery may not be sent, such as in the case of ephemeris. The mobile station or base station could determine, based on the ephemeris age limit, satellite IDs and associated IODE, that requesting or transmitting this data is unnecessary if the data at the mobile station is still valid. The mobile station or base station may determine that only a partial set of ephemeris data is necessary. If location assistance data is sent from the base station to the mobile station, the data is stored in the phone. The mobile station then enters the analog mode. The location assistance data is accessed when a location service application is requested.

Figure 5:
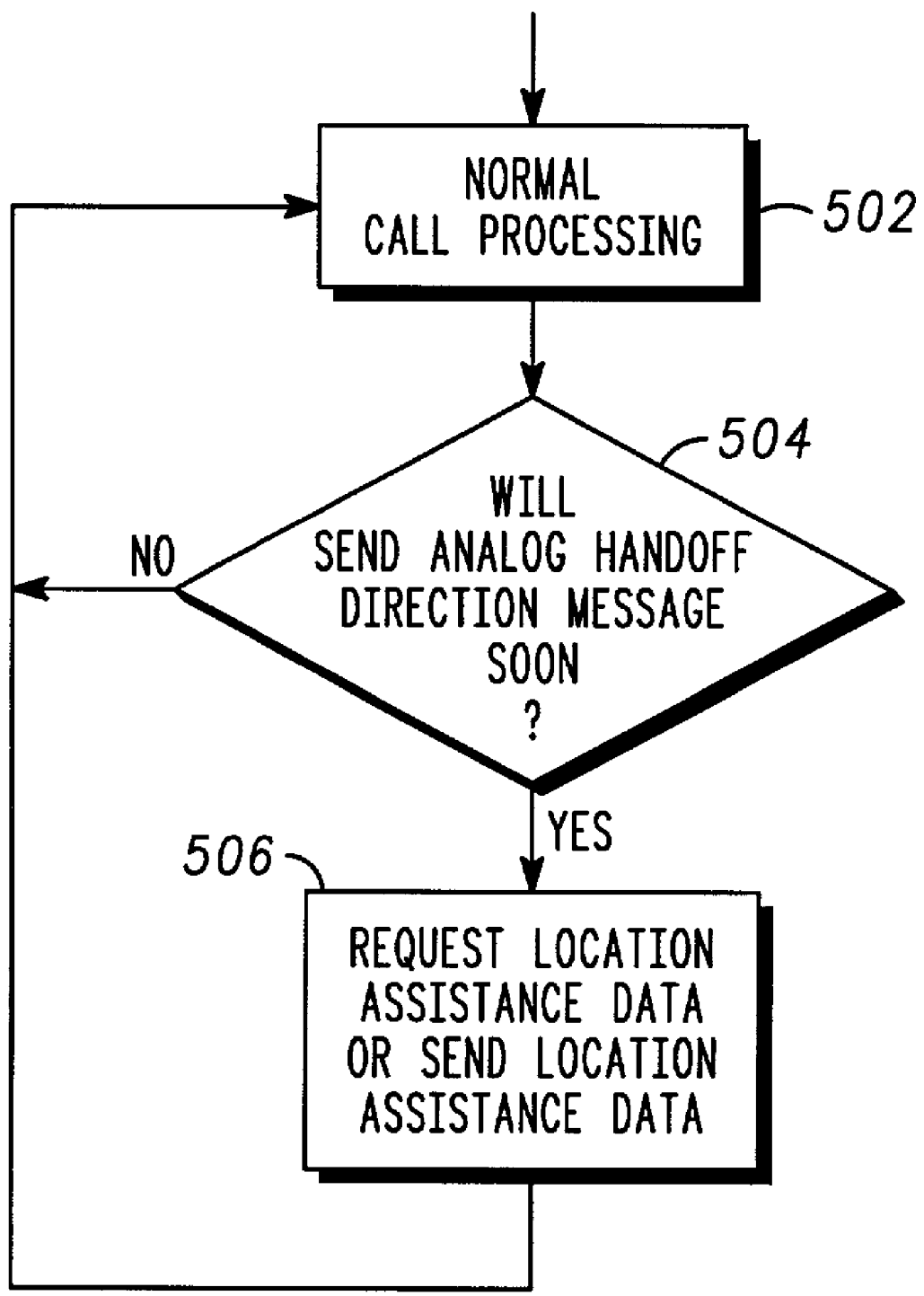
FIG. 5 is a data flow diagram illustrating a base station sending location assistance data to the mobile station before sending an analog handover direction message, according to the present invention.

FIG. 5 is a data flow diagram illustrating a base station sending location assistance data to the mobile station, according to the present invention. According to FIG. 5, the base station knows when an Analog Handoff Direction Message 504 will be sent. For example, in a mobile-assisted handover situation, if the command code SEARCH_MODE field of the Candidate Frequency Search Report Message is equal to '0001', the serving base station uses the analog frequency strength measurements in the Candidate Frequency Search Report Message to determine whether the mobile station should perform a CDMA to analog handover. If an Analog Handoff Direction Message 504 is not going to be sent to the mobile station, the base station remains in normal call processing 502. If an Analog Handoff Direction Message 504 is going to be sent to the mobile station, the base station can send or request the location server to send location assistance data to the mobile station 506 before the Analog Handoff Direction Message is sent. The location assistance data is sent from the base station to the mobile station and stored in the phone. The mobile station then enters the analog mode. The location assistance data is accessed when a location service application is requested.

An alternative method is that the mobile station predicts when the base station will send an Analog Handoff Direction Message 504 based on analog frequency strength measurements and CDMA pilot availability. The mobile station then immediately requests the location assistance data 506 from the base station prior to the anticipated execution of a CDMA to Analog handover. The location assistance data is sent from the base station to the mobile station and stored in the phone. The mobile station then enters the analog mode. The location assistance data is accessed when a location service application is requested.

Figure 6:
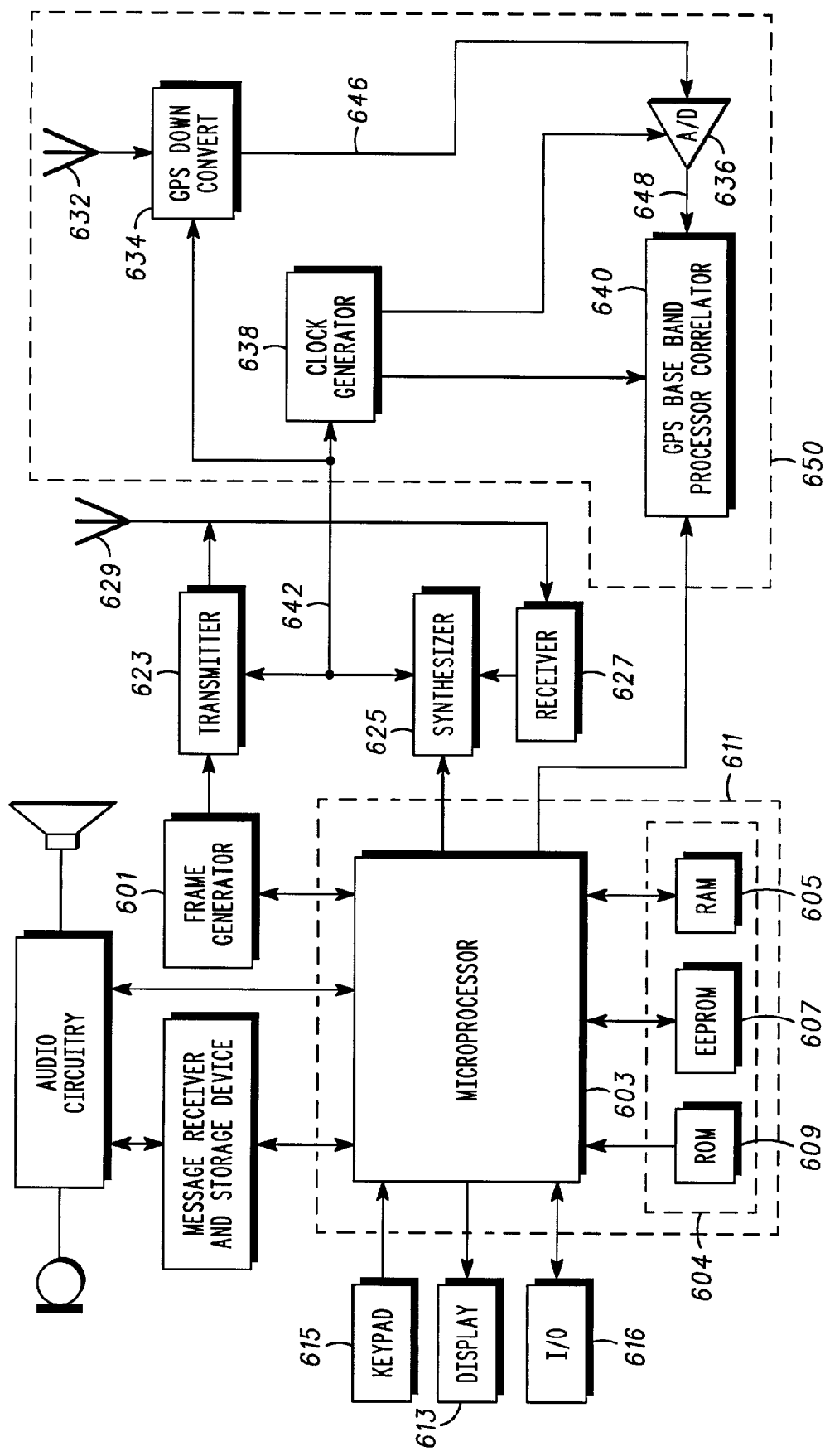
FIG. 6 is a block diagram of a mobile station such as an assisted GPS enabled mobile station, according to the present invention.

FIG. 6 is a block diagram of a mobile station such as an assisted GPS enabled mobile station incorporating the present invention. According to FIG. 6, a frame generator block 601 and a microprocessor 603 combine to generate the necessary communication protocol for operating a mobile station in a cellular system. Microprocessor 603 uses memory 604 comprising RAM 605, EEPROM 607, and ROM 609, preferably consolidated in one package 611, to execute the steps necessary to generate the transmit protocol and process the receive protocol. In addition, microprocessor 603 performs other functions for the mobile station, such as writing to a display 613, accepting information from a keypad 615, accepting input/output information by way of a connector 616, controlling a frequency synthesizer 625, performing the steps necessary to amplify a signal and receive audio output from a microphone and provide audio input to a speaker. In accordance with the preferred embodiment of the present invention, microprocessor 603 also controls the functions of the GPS circuitry 650 as well as computes the position of the mobile station.

A transmitter 623 transmits through antenna 629 using carrier frequencies produced by the frequency synthesizer 625. Information received by the antenna 629 of the mobile station enters receiver 627, which demodulates the symbols using the carrier frequencies from the frequency synthesizer 625. The microprocessor 603 may optionally include a digital signal processor means for purposes of processing digital wireless waveforms such as CDMA or TDMA waveforms. The assisted GPS receiver obtains some or all of the necessary assistance messages via communications antenna 629.

The location assistance data information is provided by a communication network entity, such as a location server, and transmitted to the mobile station by way of a unique message protocol, for example IS801 for digital mode and IS-817 for analog mode or IS-801 for digital mode and a subset of IS-801 pre-transmitted for analog mode according to the present invention, delivering some or all of the data parameters necessary for rapid mobile station position determination.

The elements of an assisted GPS receiver or a GPS receiver integrated into the mobile station consist of a GPS antenna 632 for purposes of receiving the signals transmitted by the GPS satellites. GPS receiver 650 can partially function for position measurements or fully function for position estimates. A GPS down converter 634 translates the GPS center frequency to some lower intermediate or zero-intermediate frequency (IF) 646. The intermediate or zero IF frequency is digitized with an analog to digital converter 636, which makes periodic samples of the intermediate or zero IF frequency signal upon command from a clock generator 638. The output of the analog to digital converter 636 is delivered to a baseband processor correlator 640. The baseband processor correlator 640 performs digital signal processing functions on the signal 648 for purposes of determining the time of arrival of multiple GPS satellite signals arriving simultaneously at antenna 632.

The elements of an assisted GPS receiver or GPS receiver integrated into the mobile station may optionally include a digital signal processor means for purposes of processing digital wireless waveforms or share the digital signal processor used for microprocessor 603. Microprocessor 603 monitors when a mobile station will enter a slow data rate mode, such as analog mode. Once microprocessor 603 detects or predicts that a handover to the analog mode or cell reselection is going to happen, the mobile station requests location assistance data or other service data via transmitter 623. The transmitter 623 transmits through antenna 629 using carrier frequencies produced by the frequency synthesizer 625. Before the mobile station enters the slow data rate mode, location assistance data or other service data is received by antenna 629 of the mobile station. Alternatively, the data can be requested or received any time during the fast data rate mode. The receiver 627 demodulates the symbols using the carrier frequencies from the frequency synthesizer 625. The ROM 609 or RAM 605 of the microprocessor 603 stores data within the mobile station while in the slow data rate mode until the data is requested for an instant service. The data is retrieved from the ROM 609 or RAM 605 as soon as an application, such as an emergency call requested by the communication network via a request message. The data retrieved is then processed through the microprocessor 603 in conjunction with the partial function GPS receiver 650 or full function GPS receiver 650.

The block diagram of FIG. 6 is an integrated communication device where the cellular transceiver chip set is tightly coupled with a partially or fully functioned GPS receiver chip set. The method and apparatus according to the present invention is also applicable to a non-tightly-integrated portable communication device, such as a stand-alone GPS receiver built as an accessory for the communication device. For example, a cellular transceiver used in the mobile station according to FIG. 6, can also be implemented in a personal digital assistance (PDA), pager, two-way radio, hand-held personal computer, a laptop personal computer, or navigation equipment.

The present invention used a CDMA to analog handover as an example on how to take advantages of a fast data rate mode while avoiding transmitting location assistance data over a slow data rate mode. Besides GPS assistance data, other location method data can also be transmitted such as cell ID, advanced forward link trilateration (AFLT) for CDMA systems, enhanced observed time difference (E-OTD) for GSM systems, and observed time difference of arrival (OTDOA) for UMTS/W-CDMA systems. As one skilled in the art would recognize, the techniques described, similar solutions, their extensions and variations can also be used for many other data-oriented services and applications, such as videos, multimedia, browsers, and teleconferences. They are applicable not only for CDMA to analog handover and cell reselection, but also for TDMA to analog handover and cell reselection as well as for fast data rate to slow data rate handover and cell reselection, such as from a packet switched cell to a circuit switched cell (GPRS to GSM), a W-CDMA/UMTS cell to a GSM cell, and a fast data rate mode to a slow data rate mode within a W-CDMA/UMTS system or a cdma2000/cdmaOne system.

The above invention as been described with respect to a Global Positioning Satellite (GPS) system. However, this invention is applicable to other satellite positioning systems or Global Navigation Satellite Systems (GNSS), such as the Russian GLONASS and European Galileo systems. The present invention is also applicable to other types of communication systems, for example, satellite communication systems, such as Globalstar, IOC, Iridium, Odyssey, and Orbcomm. For example, a mobile station can request data from a satellite communication network prior to the mobile station entering the slow data rate mode from a fast data rate mode. Likewise, the satellite communication network can transmit data to the mobile station prior to the mobile station entering the slow data rate mode from a fast data rate mode. Furthermore, the data can be requested and transmitted from the Internet as well.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A mobile wireless communication station that operates in a first data rate mode and second data rate mode, comprising:
    a processor for predicting when the mobile wireless communication station transitions between the first data rate mode and the second data rate mode;
    a transmitter coupled to the processor, the transmitter for transmitting data before the mobile wireless communication station transitions between the first data rate mode and the second data rate mode;
    a means for requesting data from a cellular communication network prior to the mobile communication station transitioning between the first data rate mode and the second data rate mode;
    a means for requesting Global Positioning Satellite system data from the cellular communication network before transitioning; and
    a means for requesting ephemeris data from the cellular communication network before transitioning.

2. The mobile wireless communication station of claim 1, further comprising a means for receiving ephemeris data from the cellular communication network before transitioning.

* * * * *